US009643250B2

(12) United States Patent
Mazyar et al.

(10) Patent No.: US 9,643,250 B2
(45) Date of Patent: May 9, 2017

(54) METHOD OF CONTROLLING THE CORROSION RATE OF ALLOY PARTICLES, ALLOY PARTICLE WITH CONTROLLED CORROSION RATE, AND ARTICLES COMPRISING THE PARTICLE

(75) Inventors: Oleg A. Mazyar, Houston, TX (US); Michael Johnson, Katy, TX (US); Randall Guest, Spring, TX (US); Nicholas Carrejo, Katy, TX (US); Wayne Furlan, Cypress, TX (US); Sean Gaudette, Katy, TX (US); Zhiyue Xu, Cypress, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 1157 days.

(21) Appl. No.: 13/194,271

(22) Filed: Jul. 29, 2011

(65) Prior Publication Data

US 2013/0029886 A1 Jan. 31, 2013

(51) Int. Cl.
| | |
|---|---|
| *C09K 8/54* | (2006.01) |
| *B22F 3/02* | (2006.01) |
| *B05D 5/00* | (2006.01) |
| *B22F 1/02* | (2006.01) |
| *C22C 23/02* | (2006.01) |
| *C23C 30/00* | (2006.01) |
| *C25D 3/42* | (2006.01) |

(52) U.S. Cl.
CPC .............. *B22F 3/02* (2013.01); *B05D 5/00* (2013.01); *B22F 1/025* (2013.01); *C09K 8/54* (2013.01); *C22C 23/02* (2013.01); *C23C 30/00* (2013.01); *C25D 3/42* (2013.01); *B22F 2301/052* (2013.01); *B22F 2301/058* (2013.01); *B22F 2998/10* (2013.01)

(58) Field of Classification Search
CPC ...... C09K 8/805; C09K 8/80; C09K 2208/32; C09K 8/74; C09K 8/42; C09K 8/54; C09K 8/605; C09K 2208/08; C09K 8/487; C09K 8/524; C09K 8/68; C09K 8/72; C09K 2208/00; C09K 2208/10; C09K 2208/20; C09K 2208/30; C09K 8/03; C09K 8/52; C09K 8/92; C09K 2208/26; C09K 8/035; C09K 8/08; C09K 8/20; C09K 8/40; C09K 8/422; C09K 8/467; C09K 8/516; C09K 8/518; C09K 8/536; C09K 8/665; C09K 8/703; C09K 8/94; C09K 2208/04; C09K 2208/12; C09K 2208/18; C09K 2208/22; C09K 8/426; C09K 8/473; C09K 8/50; C09K 8/5045; C09K 8/506; C09K 8/528; C09K 8/572; C09K 8/58; C09K 8/70
See application file for complete search history.

(56) References Cited

U.S. PATENT DOCUMENTS

| | | | |
|---|---|---|---|
| 2,238,895 A | 4/1941 | Gage | |
| 2,261,292 A | 11/1941 | Salnikov | |
| 2,301,624 A | 11/1942 | Holt | |
| 2,983,634 A | 5/1961 | Budininkas et al. | |
| 3,106,959 A | 10/1963 | Huitt et al. | |
| 3,152,009 A | 10/1964 | DeLong | |
| 3,196,949 A | 7/1965 | Thomas | |
| 3,390,724 A | 7/1968 | Caldwell | |
| 3,395,758 A | 8/1968 | Kelly et al. | |
| 3,406,101 A * | 10/1968 | Kilpatrick | G01N 17/02 204/404 |
| 3,465,181 A | 9/1969 | Colby et al. | |
| 3,513,230 A | 5/1970 | Rhees et al. | |
| 3,637,446 A | 1/1972 | Elliott et al. | |
| 3,645,331 A | 2/1972 | Maurer et al. | |
| 3,765,484 A | 10/1973 | Hamby, Jr. et al. | |
| 3,768,563 A | 10/1973 | Blount | |
| 3,775,823 A | 12/1973 | Adolph et al. | |
| 3,878,889 A | 4/1975 | Seabourn | |
| 3,894,850 A | 7/1975 | Kovalchuk et al. | |
| 3,924,677 A | 12/1975 | Prenner et al. | |
| 4,010,583 A | 3/1977 | Highberg | |
| 4,039,717 A | 8/1977 | Titus | |
| 4,050,529 A | 9/1977 | Tagirov et al. | |
| 4,248,307 A | 2/1981 | Silberman et al. | |
| 4,372,384 A | 2/1983 | Kinney | |

(Continued)

FOREIGN PATENT DOCUMENTS

| | | |
|---|---|---|
| CN | 1076968 | 10/1993 |
| CN | 1255879 A | 6/2000 |

(Continued)

OTHER PUBLICATIONS

S. L. Lee, C. W. Hsu, F. K. Hsu, C. Y. Chou, C. K. Lin, C. W. Weng, Effects of Ni addition on hydrogen storage properties of Mg17Al12 alloy, Materials Chemistry and Physics, 2011, 126, 319-324.*
M. Liu, P. J. Uggowitzer, A.V. Nagasekhar, P. Schmutz, M. Easton, G. L. Song, A. Atrens, Calculated phase diagrams and the corrosion of die-cast Mg—Al alloys, Corrosion Science, 2009, 51, 606-619.*
M. Bououdina, Z.X. Guo, Comparative study of mechanical alloying of (Mg+Al) and (Mg+Al+Ni) mixtures for hydrogen storage, J. Alloys. Compds, 2002, 336, 222-231.*
T.J. Bastow, S. Celotto, Clustering and formation of nano-precipitates in dilute aluminum and magnesium alloys, Materials science and Engineering, 2003, C23, 757-762.*

(Continued)

*Primary Examiner* — Kumar R Bhushan
(74) *Attorney, Agent, or Firm* — Cantor Colburn LLP (57) ABSTRACT

A composite particle comprises a core, a shielding layer deposited on the core, and further comprising an interlayer region formed at an interface of the shielding layer and the core, the interlayer region having a reactivity less than that of the core, and the shielding layer having a reactivity less than that of the interlayer region, a metallic layer not identical to the shielding layer and deposited on the shielding layer, the metallic layer having a reactivity less than that of the core, and optionally, an adhesion metal layer deposited on the metallic layer.

19 Claims, 3 Drawing Sheets

(56) References Cited

U.S. PATENT DOCUMENTS

| | | | |
|---|---|---|---|
| 4,373,584 A | 2/1983 | Silberman et al. |
| 4,374,543 A | 2/1983 | Richardson |
| 4,384,616 A | 5/1983 | Dellinger |
| 4,399,871 A | 8/1983 | Adkins et al. |
| 4,422,508 A | 12/1983 | Rutledge, Jr. et al. |
| 4,452,311 A | 6/1984 | Speegle et al. |
| 4,498,543 A | 2/1985 | Pye et al. |
| 4,499,048 A | 2/1985 | Hanejko |
| 4,499,049 A | 2/1985 | Hanejko |
| 4,534,414 A | 8/1985 | Pringle |
| 4,539,175 A | 9/1985 | Lichti et al. |
| 4,554,986 A | 11/1985 | Jones |
| 4,640,354 A | 2/1987 | Boisson |
| 4,664,962 A | 5/1987 | DesMarais, Jr. |
| 4,673,549 A | 6/1987 | Ecer |
| 4,674,572 A | 6/1987 | Gallus |
| 4,678,037 A | 7/1987 | Smith |
| 4,681,133 A | 7/1987 | Weston |
| 4,688,641 A | 8/1987 | Knieriemen |
| 4,693,863 A | 9/1987 | Del Corso et al. |
| 4,703,807 A | 11/1987 | Weston |
| 4,706,753 A | 11/1987 | Ohkochi et al. |
| 4,708,202 A | 11/1987 | Sukup et al. |
| 4,708,208 A | 11/1987 | Halbardier |
| 4,709,761 A | 12/1987 | Setterberg, Jr. |
| 4,714,116 A | 12/1987 | Brunner |
| 4,721,159 A | 1/1988 | Ohkochi et al. |
| 4,738,599 A | 4/1988 | Shilling |
| 4,768,588 A | 9/1988 | Kupsa |
| 4,784,226 A | 11/1988 | Wyatt |
| 4,805,699 A | 2/1989 | Halbardier |
| 4,817,725 A | 4/1989 | Jenkins |
| 4,834,184 A | 5/1989 | Streich et al. |
| H635 H | 6/1989 | Johnson et al. |
| 4,850,432 A | 7/1989 | Porter et al. |
| 4,853,056 A | 8/1989 | Hoffman |
| 4,869,324 A | 9/1989 | Holder |
| 4,869,325 A | 9/1989 | Halbardier |
| 4,889,187 A | 12/1989 | Terrell et al. |
| 4,890,675 A | 1/1990 | Dew |
| 4,909,320 A | 3/1990 | Hebert et al. |
| 4,929,415 A | 5/1990 | Okazaki |
| 4,932,474 A | 6/1990 | Schroeder, Jr. et al. |
| 4,944,351 A | 7/1990 | Eriksen et al. |
| 4,949,788 A | 8/1990 | Szarka et al. |
| 4,952,902 A | 8/1990 | Kawaguchi et al. |
| 4,975,412 A | 12/1990 | Okazaki et al. |
| 4,977,958 A | 12/1990 | Miller |
| 4,981,177 A | 1/1991 | Carmody et al. |
| 4,986,361 A | 1/1991 | Mueller et al. |
| 5,006,044 A | 4/1991 | Walker, Sr. et al. |
| 5,010,955 A | 4/1991 | Springer |
| 5,036,921 A | 8/1991 | Pittard et al. |
| 5,048,611 A | 9/1991 | Cochran |
| 5,049,165 A | 9/1991 | Tselesin |
| 5,061,323 A | 10/1991 | DeLuccia |
| 5,063,775 A | 11/1991 | Walker, Sr. et al. |
| 5,073,207 A * | 12/1991 | Faure ............... C22C 1/0408 148/667 |
| 5,074,361 A | 12/1991 | Brisco et al. |
| 5,084,088 A | 1/1992 | Okazaki |
| 5,090,480 A | 2/1992 | Pittard et al. |
| 5,095,988 A | 3/1992 | Bode |
| 5,103,911 A | 4/1992 | Heijnen |
| 5,117,915 A | 6/1992 | Mueller et al. |
| 5,161,614 A | 11/1992 | Wu et al. |
| 5,178,216 A | 1/1993 | Giroux et al. |
| 5,181,571 A | 1/1993 | Mueller et al. |
| 5,188,182 A | 2/1993 | Echols, III et al. |
| 5,188,183 A | 2/1993 | Hopmann et al. |
| 5,222,867 A | 6/1993 | Walker, Sr. et al. |
| 5,226,483 A | 7/1993 | Williamson, Jr. |
| 5,228,518 A | 7/1993 | Wilson et al. |
| 5,234,055 A | 8/1993 | Cornette |
| 5,253,714 A | 10/1993 | Davis et al. |
| 5,271,468 A | 12/1993 | Streich et al. |
| 5,282,509 A | 2/1994 | Schurr, III |
| 5,293,940 A | 3/1994 | Hromas et al. |
| 5,309,874 A | 5/1994 | Willermet et al. |
| 5,310,000 A | 5/1994 | Arterbury et al. |
| 5,318,746 A | 6/1994 | Lashmore |
| 5,380,473 A | 1/1995 | Bogue et al. |
| 5,392,860 A | 2/1995 | Ross |
| 5,394,941 A | 3/1995 | Venditto et al. |
| 5,398,754 A | 3/1995 | Dinhoble |
| 5,407,011 A | 4/1995 | Layton |
| 5,411,082 A | 5/1995 | Kennedy |
| 5,417,285 A | 5/1995 | Van Buskirk et al. |
| 5,427,177 A | 6/1995 | Jordan, Jr. et al. |
| 5,435,392 A | 7/1995 | Kennedy |
| 5,439,051 A | 8/1995 | Kennedy et al. |
| 5,454,430 A | 10/1995 | Kennedy et al. |
| 5,456,317 A | 10/1995 | Hood, III et al. |
| 5,464,062 A | 11/1995 | Blizzard, Jr. |
| 5,472,048 A | 12/1995 | Kennedy et al. |
| 5,474,131 A | 12/1995 | Jordan, Jr. et al. |
| 5,477,923 A | 12/1995 | Jordan, Jr. et al. |
| 5,526,880 A | 6/1996 | Jordan, Jr. et al. |
| 5,526,881 A | 6/1996 | Martin et al. |
| 5,529,746 A | 6/1996 | Knoss et al. |
| 5,533,573 A | 7/1996 | Jordan, Jr. et al. |
| 5,536,485 A | 7/1996 | Kume et al. |
| 5,558,153 A | 9/1996 | Holcombe et al. |
| 5,607,017 A | 3/1997 | Owens et al. |
| 5,623,993 A | 4/1997 | Van Buskirk et al. |
| 5,623,994 A | 4/1997 | Robinson |
| 5,636,691 A | 6/1997 | Hendrickson et al. |
| 5,641,023 A | 6/1997 | Ross et al. |
| 5,647,444 A | 7/1997 | Williams |
| 5,665,289 A | 9/1997 | Chung et al. |
| 5,677,372 A | 10/1997 | Yamamoto et al. |
| 5,685,372 A | 11/1997 | Gano |
| 5,707,214 A | 1/1998 | Schmidt |
| 5,709,269 A | 1/1998 | Head |
| 5,720,344 A | 2/1998 | Newman |
| 5,765,639 A | 6/1998 | Muth |
| 5,772,735 A | 6/1998 | Sehgal et al. |
| 5,782,305 A | 7/1998 | Hicks |
| 5,797,454 A | 8/1998 | Hipp |
| 5,826,652 A | 10/1998 | Tapp |
| 5,826,661 A | 10/1998 | Parker et al. |
| 5,829,520 A | 11/1998 | Johnson |
| 5,836,396 A | 11/1998 | Norman |
| 5,857,521 A | 1/1999 | Ross et al. |
| 5,881,816 A | 3/1999 | Wright |
| 5,934,372 A | 8/1999 | Muth |
| 5,960,881 A | 10/1999 | Allamon et al. |
| 5,990,051 A | 11/1999 | Ischy et al. |
| 5,992,452 A | 11/1999 | Nelson, II |
| 5,992,520 A | 11/1999 | Schultz et al. |
| 6,007,314 A | 12/1999 | Nelson, II |
| 6,024,915 A | 2/2000 | Kume et al. |
| 6,032,735 A | 3/2000 | Echols |
| 6,047,773 A | 4/2000 | Zeltmann et al. |
| 6,050,340 A | 4/2000 | Scott |
| 6,069,313 A | 5/2000 | Kay |
| 6,076,600 A | 6/2000 | Vick, Jr. et al. |
| 6,079,496 A | 6/2000 | Hirth |
| 6,085,837 A | 7/2000 | Massinon et al. |
| 6,095,247 A | 8/2000 | Streich et al. |
| 6,119,783 A | 9/2000 | Parker et al. |
| 6,142,237 A | 11/2000 | Christmas et al. |
| 6,161,622 A | 12/2000 | Robb et al. |
| 6,167,970 B1 | 1/2001 | Stout et al. |
| 6,173,779 B1 | 1/2001 | Smith |
| 6,189,616 B1 | 2/2001 | Gano et al. |
| 6,213,202 B1 | 4/2001 | Read, Jr. |
| 6,220,350 B1 | 4/2001 | Brothers et al. |
| 6,220,357 B1 | 4/2001 | Carmichael |
| 6,228,904 B1 | 5/2001 | Yadav et al. |
| 6,237,688 B1 | 5/2001 | Burleson et al. |
| 6,238,280 B1 | 5/2001 | Ritt et al. |
| 6,241,021 B1 | 6/2001 | Bowling |
| 6,250,392 B1 | 6/2001 | Muth |

(56) References Cited

U.S. PATENT DOCUMENTS

| | | |
|---|---|---|
| 6,273,187 B1 | 8/2001 | Voisin, Jr. et al. |
| 6,276,452 B1 | 8/2001 | Davis et al. |
| 6,276,457 B1 | 8/2001 | Moffatt et al. |
| 6,279,656 B1 | 8/2001 | Sinclair et al. |
| 6,287,445 B1 | 9/2001 | Lashmore et al. |
| 6,302,205 B1 | 10/2001 | Ryll |
| 6,315,041 B1 | 11/2001 | Carlisle et al. |
| 6,315,050 B2 | 11/2001 | Vaynshteyn et al. |
| 6,325,148 B1 | 12/2001 | Trahan et al. |
| 6,328,110 B1 | 12/2001 | Joubert |
| 6,341,653 B1 | 1/2002 | Firmaniuk et al. |
| 6,349,766 B1 | 2/2002 | Bussear et al. |
| 6,354,379 B2 | 3/2002 | Miszewski et al. |
| 6,371,206 B1 | 4/2002 | Mills |
| 6,372,346 B1 | 4/2002 | Toth |
| 6,382,244 B2 | 5/2002 | Vann |
| 6,390,195 B1 | 5/2002 | Nguyen et al. |
| 6,390,200 B1 | 5/2002 | Allamon et al. |
| 6,394,185 B1 | 5/2002 | Constien |
| 6,397,950 B1 | 6/2002 | Streich et al. |
| 6,403,210 B1 * | 6/2002 | Stuivinga .......... B22F 3/008 419/27 |
| 6,408,946 B1 | 6/2002 | Marshall et al. |
| 6,419,023 B1 | 7/2002 | George et al. |
| 6,439,313 B1 | 8/2002 | Thomeer et al. |
| 6,457,525 B1 | 10/2002 | Scott |
| 6,467,546 B2 | 10/2002 | Allamon et al. |
| 6,470,965 B1 | 10/2002 | Winzer |
| 6,491,097 B1 | 12/2002 | ONeal et al. |
| 6,491,116 B2 | 12/2002 | Berscheidt et al. |
| 6,513,598 B2 | 2/2003 | Moore et al. |
| 6,540,033 B1 | 4/2003 | Sullivan et al. |
| 6,543,543 B2 | 4/2003 | Muth |
| 6,561,275 B2 | 5/2003 | Glass et al. |
| 6,588,507 B2 | 7/2003 | Dusterhoft et al. |
| 6,591,915 B2 | 7/2003 | Burris et al. |
| 6,601,648 B2 | 8/2003 | Ebinger |
| 6,601,650 B2 | 8/2003 | Sundararajan |
| 6,612,826 B1 | 9/2003 | Bauer et al. |
| 6,613,383 B1 | 9/2003 | George et al. |
| 6,619,400 B2 | 9/2003 | Brunet |
| 6,634,428 B2 | 10/2003 | Krauss et al. |
| 6,662,886 B2 | 12/2003 | Russell |
| 6,675,889 B1 | 1/2004 | Mullins et al. |
| 6,713,177 B2 | 3/2004 | George et al. |
| 6,715,541 B2 | 4/2004 | Pedersen et al. |
| 6,719,051 B2 | 4/2004 | Hailey, Jr. et al. |
| 6,755,249 B2 | 6/2004 | Robison et al. |
| 6,776,228 B2 | 8/2004 | Pedersen et al. |
| 6,779,599 B2 | 8/2004 | Mullins et al. |
| 6,799,638 B2 | 10/2004 | Butterfield, Jr. |
| 6,810,960 B2 | 11/2004 | Pia |
| 6,817,414 B2 | 11/2004 | Lee |
| 6,831,044 B2 | 12/2004 | Constien |
| 6,883,611 B2 | 4/2005 | Smith et al. |
| 6,887,297 B2 | 5/2005 | Winter et al. |
| 6,896,049 B2 | 5/2005 | Moyes |
| 6,896,061 B2 | 5/2005 | Hriscu et al. |
| 6,899,176 B2 | 5/2005 | Hailey, Jr. et al. |
| 6,913,827 B2 | 7/2005 | George et al. |
| 6,926,086 B2 | 8/2005 | Patterson et al. |
| 6,932,159 B2 | 8/2005 | Hovem |
| 6,945,331 B2 | 9/2005 | Patel |
| 6,959,759 B2 | 11/2005 | Doane et al. |
| 6,973,970 B2 | 12/2005 | Johnston et al. |
| 6,973,973 B2 | 12/2005 | Howard et al. |
| 6,983,796 B2 | 1/2006 | Bayne et al. |
| 6,986,390 B2 | 1/2006 | Doane et al. |
| 7,013,989 B2 | 3/2006 | Hammond et al. |
| 7,017,664 B2 | 3/2006 | Walker et al. |
| 7,017,677 B2 | 3/2006 | Keshavan et al. |
| 7,021,389 B2 | 4/2006 | Bishop et al. |
| 7,025,146 B2 | 4/2006 | King et al. |
| 7,028,778 B2 | 4/2006 | Krywitsky |
| 7,044,230 B2 | 5/2006 | Starr et al. |
| 7,049,272 B2 | 5/2006 | Sinclair et al. |
| 7,051,805 B2 | 5/2006 | Doane et al. |
| 7,059,410 B2 | 6/2006 | Bousche et al. |
| 7,090,027 B1 | 8/2006 | Williams |
| 7,093,664 B2 | 8/2006 | Todd et al. |
| 7,096,945 B2 | 8/2006 | Richards et al. |
| 7,096,946 B2 | 8/2006 | Jasser et al. |
| 7,097,906 B2 | 8/2006 | Gardner |
| 7,108,080 B2 | 9/2006 | Tessari et al. |
| 7,111,682 B2 | 9/2006 | Blaisdell |
| 7,141,207 B2 | 11/2006 | Jandeska, Jr. et al. |
| 7,150,326 B2 | 12/2006 | Bishop et al. |
| 7,163,066 B2 | 1/2007 | Lehr |
| 7,174,963 B2 | 2/2007 | Bertelsen |
| 7,182,135 B2 | 2/2007 | Szarka |
| 7,210,527 B2 | 5/2007 | Walker et |
| 7,210,533 B2 | 5/2007 | Starr et al. |
| 7,217,311 B2 | 5/2007 | Hong et al. |
| 7,234,530 B2 | 6/2007 | Gass |
| 7,252,162 B2 | 8/2007 | Akinlade et al. |
| 7,255,172 B2 | 8/2007 | Johnson |
| 7,255,178 B2 | 8/2007 | Slup et al. |
| 7,264,060 B2 | 9/2007 | Wills |
| 7,267,178 B2 | 9/2007 | Krywitsky |
| 7,270,186 B2 | 9/2007 | Johnson |
| 7,287,592 B2 | 10/2007 | Surjaatmadja et al. |
| 7,311,152 B2 | 12/2007 | Howard et al. |
| 7,320,365 B2 | 1/2008 | Pia |
| 7,322,412 B2 | 1/2008 | Badalamenti et al. |
| 7,322,417 B2 | 1/2008 | Rytlewski et al. |
| 7,325,617 B2 | 2/2008 | Murray |
| 7,328,750 B2 | 2/2008 | Swor et al. |
| 7,331,388 B2 | 2/2008 | Vilela et al. |
| 7,337,854 B2 | 3/2008 | Horn et al. |
| 7,346,456 B2 | 3/2008 | Le Bemadjiel |
| 7,360,593 B2 | 4/2008 | Constien |
| 7,360,597 B2 | 4/2008 | Blaisdell |
| 7,387,165 B2 | 6/2008 | Lopez de Cardenas et al. |
| 7,401,648 B2 | 7/2008 | Richard |
| 7,416,029 B2 | 8/2008 | Telfer et al. |
| 7,426,964 B2 | 9/2008 | Lynde et al. |
| 7,441,596 B2 | 10/2008 | Wood et al. |
| 7,445,049 B2 | 11/2008 | Howard et al. |
| 7,451,815 B2 | 11/2008 | Hailey, Jr. |
| 7,451,817 B2 | 11/2008 | Reddy et al. |
| 7,461,699 B2 | 12/2008 | Richard et al. |
| 7,464,764 B2 | 12/2008 | Xu |
| 7,472,750 B2 | 1/2009 | Walker et al. |
| 7,478,676 B2 | 1/2009 | East, Jr. et al. |
| 7,503,390 B2 | 3/2009 | Gomez |
| 7,503,399 B2 | 3/2009 | Badalamenti et al. |
| 7,510,018 B2 | 3/2009 | Williamson et al. |
| 7,513,311 B2 | 4/2009 | Gramstad et al. |
| 7,527,103 B2 | 5/2009 | Huang et al. |
| 7,537,825 B1 | 5/2009 | Wardle et al. |
| 7,552,777 B2 | 6/2009 | Murray et al. |
| 7,552,779 B2 | 6/2009 | Murray |
| 7,575,062 B2 | 8/2009 | East, Jr. |
| 7,591,318 B2 | 9/2009 | Tilghman |
| 7,600,572 B2 | 10/2009 | Slup et al. |
| 7,635,023 B2 | 12/2009 | Goldberg et al. |
| 7,640,988 B2 | 1/2010 | Phi et al. |
| 7,661,480 B2 | 2/2010 | Al-Anazi |
| 7,661,481 B2 | 2/2010 | Todd et al. |
| 7,665,537 B2 | 2/2010 | Patel et al. |
| 7,686,082 B2 | 3/2010 | Marsh |
| 7,690,436 B2 | 4/2010 | Turley et al. |
| 7,699,101 B2 | 4/2010 | Fripp et al. |
| 7,703,511 B2 | 4/2010 | Buyers et al. |
| 7,708,078 B2 | 5/2010 | Stoesz |
| 7,709,421 B2 | 5/2010 | Jones et al. |
| 7,712,541 B2 | 5/2010 | Loretz et al. |
| 7,723,272 B2 | 5/2010 | Crews et al. |
| 7,726,406 B2 | 6/2010 | Xu |
| 7,757,773 B2 | 7/2010 | Rytlewski |
| 7,762,342 B2 | 7/2010 | Richard et al. |
| 7,770,652 B2 | 8/2010 | Barnett |
| 7,775,284 B2 | 8/2010 | Richards et al. |
| 7,775,286 B2 | 8/2010 | Duphorne |

(56) References Cited

U.S. PATENT DOCUMENTS

| | | |
|---|---|---|
| 7,784,543 B2 | 8/2010 | Johnson |
| 7,798,225 B2 | 9/2010 | Giroux et al. |
| 7,798,226 B2 | 9/2010 | Themig |
| 7,798,236 B2 | 9/2010 | McKeachnie et al. |
| 7,806,189 B2 | 10/2010 | Frazier |
| 7,806,192 B2 | 10/2010 | Foster et al. |
| 7,810,553 B2 | 10/2010 | Cruickshank et al. |
| 7,810,567 B2 | 10/2010 | Daniels et al. |
| 7,819,198 B2 | 10/2010 | Birckhead et al. |
| 7,828,055 B2 | 11/2010 | Willauer et al. |
| 7,833,944 B2 | 11/2010 | Munoz et al. |
| 7,849,927 B2 | 12/2010 | Herrera |
| 7,855,168 B2 | 12/2010 | Fuller et al. |
| 7,861,781 B2 | 1/2011 | D'Arcy |
| 7,874,365 B2 | 1/2011 | East, Jr. et al. |
| 7,878,253 B2 | 2/2011 | Stowe et al. |
| 7,896,091 B2 | 3/2011 | Williamson et al. |
| 7,897,063 B1 | 3/2011 | Perry et al. |
| 7,900,696 B1 | 3/2011 | Nish et al. |
| 7,900,703 B2 | 3/2011 | Clark et al. |
| 7,909,096 B2 | 3/2011 | Clark et al. |
| 7,909,104 B2 | 3/2011 | Bjorgum |
| 7,909,110 B2 | 3/2011 | Sharma et al. |
| 7,913,765 B2 | 3/2011 | Crow et al. |
| 7,931,093 B2 | 4/2011 | Foster et al. |
| 7,938,191 B2 | 5/2011 | Vaidya |
| 7,946,340 B2 | 5/2011 | Surjaatmadja et al. |
| 7,958,940 B2 | 6/2011 | Jameson |
| 7,963,331 B2 | 6/2011 | Surjaatmadja et al. |
| 7,963,340 B2 | 6/2011 | Gramstad et al. |
| 7,963,342 B2 | 6/2011 | George |
| 7,980,300 B2 | 7/2011 | Roberts et al. |
| 7,987,906 B1 | 8/2011 | Troy |
| 8,020,619 B1 | 9/2011 | Robertson et al. |
| 8,020,620 B2 | 9/2011 | Daniels et al. |
| 8,025,104 B2 | 9/2011 | Cooke, Jr. |
| 8,028,767 B2 | 10/2011 | Radford et al. |
| 8,033,331 B2 | 10/2011 | Themig |
| 8,039,422 B1 | 10/2011 | Al-Zahrani |
| 8,056,628 B2 | 11/2011 | Whitsitt et al. |
| 8,056,638 B2 | 11/2011 | Clayton et al. |
| 8,109,340 B2 | 2/2012 | Doane et al. |
| 8,127,856 B1 | 3/2012 | Nish et al. |
| 8,211,248 B2 | 7/2012 | Marya |
| 8,231,947 B2 | 7/2012 | Vaidya et al. |
| 8,276,670 B2 | 10/2012 | Patel |
| 8,327,931 B2 | 12/2012 | Agrawal et al. |
| 8,403,037 B2 | 3/2013 | Agrawal et al. |
| 2001/0045285 A1 | 11/2001 | Russell |
| 2001/0045288 A1 | 11/2001 | Allamon et al. |
| 2002/0000319 A1 | 1/2002 | Brunet |
| 2002/0007948 A1 | 1/2002 | Bayne et al. |
| 2002/0014268 A1 | 2/2002 | Vann |
| 2002/0066572 A1 | 6/2002 | Muth |
| 2002/0104616 A1 | 8/2002 | De et al. |
| 2002/0136904 A1 | 9/2002 | Glass et al. |
| 2002/0162661 A1 | 11/2002 | Krauss et al. |
| 2003/0037925 A1 | 2/2003 | Walker et al. |
| 2003/0075326 A1 | 4/2003 | Ebinger |
| 2003/0104147 A1 | 6/2003 | Bretschneider et al. |
| 2003/0111728 A1 | 6/2003 | Thai et al. |
| 2003/0141060 A1 | 7/2003 | Hailey et al. |
| 2003/0141061 A1 | 7/2003 | Hailey et al. |
| 2003/0141079 A1 | 7/2003 | Doane et al. |
| 2003/0150614 A1 | 8/2003 | Brown et al. |
| 2003/0155114 A1 | 8/2003 | Pedersen et al. |
| 2003/0155115 A1 | 8/2003 | Pedersen et al. |
| 2003/0159828 A1 | 8/2003 | Howard et al. |
| 2003/0164237 A1 | 9/2003 | Butterfield |
| 2003/0183391 A1 | 10/2003 | Hriscu et al. |
| 2004/0005483 A1 | 1/2004 | Lin |
| 2004/0020832 A1 | 2/2004 | Richards et al. |
| 2004/0045723 A1 | 3/2004 | Slup et al. |
| 2004/0089449 A1 | 5/2004 | Walton et al. |
| 2004/0159428 A1 | 8/2004 | Hammond et al. |
| 2004/0182583 A1 | 9/2004 | Doane et al. |
| 2004/0256109 A1 | 12/2004 | Johnson |
| 2004/0256157 A1 | 12/2004 | Tessari et al. |
| 2005/0034876 A1 | 2/2005 | Doane et al. |
| 2005/0051329 A1 | 3/2005 | Blaisdell |
| 2005/0069449 A1 | 3/2005 | Jackson et al. |
| 2005/0102255 A1 | 5/2005 | Bultman |
| 2005/0161224 A1 | 7/2005 | Starr et al. |
| 2005/0165149 A1 | 7/2005 | Chanak et al. |
| 2005/0194143 A1 | 9/2005 | Xu et al. |
| 2005/0205264 A1 | 9/2005 | Starr et al. |
| 2005/0205266 A1 | 9/2005 | Todd et al. |
| 2005/0241824 A1 | 11/2005 | Burris, II et al. |
| 2005/0241825 A1 | 11/2005 | Burris, II et al. |
| 2005/0257936 A1 | 11/2005 | Lehr |
| 2005/0279501 A1 | 12/2005 | Surjaatmadja et al. |
| 2006/0012087 A1 | 1/2006 | Matsuda et al. |
| 2006/0045787 A1* | 3/2006 | Jandeska, Jr. ........... B22F 1/025 419/47 |
| 2006/0057479 A1 | 3/2006 | Niimi et al. |
| 2006/0081378 A1 | 4/2006 | Howard et al. |
| 2006/0102871 A1 | 5/2006 | Wang et al. |
| 2006/0108126 A1 | 5/2006 | Horn et al. |
| 2006/0116696 A1 | 6/2006 | Odermatt et al. |
| 2006/0124310 A1 | 6/2006 | Lopez de Cardenas |
| 2006/0124312 A1 | 6/2006 | Rytlewski et al. |
| 2006/0131011 A1 | 6/2006 | Lynde et al. |
| 2006/0144515 A1 | 7/2006 | Tada et al. |
| 2006/0150770 A1* | 7/2006 | Freim, III ............... B22F 1/025 75/343 |
| 2006/0151178 A1 | 7/2006 | Howard et al. |
| 2006/0162927 A1 | 7/2006 | Walker et al. |
| 2006/0213670 A1 | 9/2006 | Bishop et al. |
| 2006/0231253 A1 | 10/2006 | Vilela et al. |
| 2006/0283592 A1 | 12/2006 | Sierra et al. |
| 2007/0017674 A1 | 1/2007 | Blaisdell |
| 2007/0017675 A1 | 1/2007 | Hammami et al. |
| 2007/0029082 A1 | 2/2007 | Giroux et al. |
| 2007/0039741 A1 | 2/2007 | Hailey |
| 2007/0044966 A1 | 3/2007 | Davies et al. |
| 2007/0051521 A1 | 3/2007 | Fike et al. |
| 2007/0054101 A1 | 3/2007 | Sigalas et al. |
| 2007/0057415 A1 | 3/2007 | Katagiri et al. |
| 2007/0062644 A1 | 3/2007 | Nakamura et al. |
| 2007/0074873 A1 | 4/2007 | McKeachnie et al. |
| 2007/0107908 A1 | 5/2007 | Vaidya et al. |
| 2007/0108060 A1 | 5/2007 | Park |
| 2007/0119600 A1 | 5/2007 | Slup et al. |
| 2007/0131912 A1 | 6/2007 | Simone et al. |
| 2007/0151009 A1 | 7/2007 | Conrad, III et al. |
| 2007/0151769 A1 | 7/2007 | Slutz et al. |
| 2007/0169935 A1 | 7/2007 | Akbar et al. |
| 2007/0181224 A1* | 8/2007 | Marya .................... C09K 8/805 148/400 |
| 2007/0185655 A1 | 8/2007 | Le Bemadjiel |
| 2007/0187095 A1 | 8/2007 | Walker et al. |
| 2007/0221373 A1 | 9/2007 | Murray |
| 2007/0221384 A1 | 9/2007 | Murray |
| 2007/0261862 A1 | 11/2007 | Murray |
| 2007/0272411 A1 | 11/2007 | Lopez De Cardenas et al. |
| 2007/0272413 A1 | 11/2007 | Rytlewski et al. |
| 2007/0277979 A1 | 12/2007 | Todd et al. |
| 2007/0284109 A1 | 12/2007 | East et al. |
| 2007/0299510 A1 | 12/2007 | Venkatraman et al. |
| 2008/0020923 A1 | 1/2008 | Debe et al. |
| 2008/0047707 A1 | 2/2008 | Boney et al. |
| 2008/0060810 A9 | 3/2008 | Nguyen et al. |
| 2008/0066923 A1 | 3/2008 | Xu |
| 2008/0066924 A1 | 3/2008 | Xu |
| 2008/0078553 A1 | 4/2008 | George |
| 2008/0099209 A1 | 5/2008 | Loretz et al. |
| 2008/0115932 A1 | 5/2008 | Cooke |
| 2008/0149325 A1 | 6/2008 | Crawford |
| 2008/0149345 A1 | 6/2008 | Marya et al. |
| 2008/0169105 A1 | 7/2008 | Williamson et al. |
| 2008/0179104 A1 | 7/2008 | Zhang et al. |
| 2008/0202764 A1 | 8/2008 | Clayton et al. |
| 2008/0223586 A1 | 9/2008 | Barnett |
| 2008/0223587 A1 | 9/2008 | Cherewyk |

(56) References Cited

U.S. PATENT DOCUMENTS

| | | |
|---|---|---|
| 2008/0236829 A1 | 10/2008 | Lynde |
| 2008/0248205 A1 | 10/2008 | Blanchet et al. |
| 2008/0277109 A1 | 11/2008 | Vaidya |
| 2008/0277980 A1 | 11/2008 | Koda et al. |
| 2008/0296024 A1 | 12/2008 | Huang et al. |
| 2008/0314581 A1 | 12/2008 | Brown |
| 2008/0314588 A1 | 12/2008 | Langlais et al. |
| 2009/0044946 A1 | 2/2009 | Schasteen et al. |
| 2009/0044949 A1 | 2/2009 | King et al. |
| 2009/0084556 A1 | 4/2009 | Richards et al. |
| 2009/0107684 A1 | 4/2009 | Cooke, Jr. |
| 2009/0145666 A1 | 6/2009 | Radford et al. |
| 2009/0159289 A1 | 6/2009 | Avant et al. |
| 2009/0178808 A1 | 7/2009 | Williamson et al. |
| 2009/0194273 A1 | 8/2009 | Surjaatmadja et al. |
| 2009/0205841 A1 | 8/2009 | Kluge et al. |
| 2009/0226704 A1 | 9/2009 | Kauppinen et al. |
| 2009/0242202 A1 | 10/2009 | Rispler et al. |
| 2009/0242208 A1 | 10/2009 | Bolding |
| 2009/0242214 A1 | 10/2009 | Foster et al. |
| 2009/0255667 A1 | 10/2009 | Clem et al. |
| 2009/0255684 A1 | 10/2009 | Bolding |
| 2009/0255686 A1 | 10/2009 | Richard et al. |
| 2009/0260817 A1 | 10/2009 | Gambier et al. |
| 2009/0266548 A1 | 10/2009 | Olsen et al. |
| 2009/0272544 A1 | 11/2009 | Giroux et al. |
| 2009/0283270 A1 | 11/2009 | Langeslag |
| 2009/0293672 A1 | 12/2009 | Mirchandani et al. |
| 2009/0301730 A1 | 12/2009 | Gweily |
| 2009/0308588 A1 | 12/2009 | Howell et al. |
| 2009/0317556 A1 | 12/2009 | Macary |
| 2010/0025255 A1 | 2/2010 | Su et al. |
| 2010/0032151 A1 | 2/2010 | Duphorne |
| 2010/0044041 A1 | 2/2010 | Smith et al. |
| 2010/0051278 A1 | 3/2010 | Mytopher et al. |
| 2010/0089583 A1 | 4/2010 | Xu et al. |
| 2010/0089587 A1 | 4/2010 | Stout |
| 2010/0101803 A1 | 4/2010 | Clayton et al. |
| 2010/0122817 A1 | 5/2010 | Surjaatmadja et al. |
| 2010/0139930 A1 | 6/2010 | Patel et al. |
| 2010/0200230 A1 | 8/2010 | East, Jr. et al. |
| 2010/0236793 A1 | 9/2010 | Bjorgum |
| 2010/0236794 A1 | 9/2010 | Duan et al. |
| 2010/0243254 A1 | 9/2010 | Murphy et al. |
| 2010/0252273 A1 | 10/2010 | Duphorne |
| 2010/0252280 A1 | 10/2010 | Swor et al. |
| 2010/0270031 A1 | 10/2010 | Patel |
| 2010/0294510 A1 | 11/2010 | Holmes |
| 2011/0005773 A1 | 1/2011 | Dusterhoft et al. |
| 2011/0036592 A1 | 2/2011 | Fay |
| 2011/0048743 A1 | 3/2011 | Stafford et al. |
| 2011/0056692 A1 | 3/2011 | Lopez de Cardenas et al. |
| 2011/0067872 A1 | 3/2011 | Agrawal |
| 2011/0067889 A1 | 3/2011 | Marya et al. |
| 2011/0067890 A1 | 3/2011 | Themig |
| 2011/0100643 A1 | 5/2011 | Themig et al. |
| 2011/0127044 A1 | 6/2011 | Radford et al. |
| 2011/0132143 A1* | 6/2011 | Xu ............... B22F 1/02 75/232 |
| 2011/0132612 A1* | 6/2011 | Agrawal ............ E21B 43/112 166/317 |
| 2011/0132619 A1* | 6/2011 | Agrawal ............ E21B 23/04 166/376 |
| 2011/0132620 A1* | 6/2011 | Agrawal ............ E21B 23/04 166/376 |
| 2011/0132621 A1* | 6/2011 | Agrawal ............ E21B 23/04 166/376 |
| 2011/0135530 A1* | 6/2011 | Xu ............... B22F 1/02 419/13 |
| 2011/0135953 A1* | 6/2011 | Xu ............... B22F 1/02 428/548 |
| 2011/0136707 A1* | 6/2011 | Xu ............... C22C 1/04 507/270 |
| 2011/0139465 A1 | 6/2011 | Tibbles et al. |
| 2011/0147014 A1 | 6/2011 | Chen et al. |
| 2011/0186306 A1 | 8/2011 | Marya et al. |
| 2011/0214881 A1 | 9/2011 | Newton et al. |
| 2011/0247833 A1 | 10/2011 | Todd et al. |
| 2011/0253387 A1 | 10/2011 | Ervin |
| 2011/0259610 A1 | 10/2011 | Shkurti et al. |
| 2011/0277987 A1 | 11/2011 | Frazier |
| 2011/0277989 A1 | 11/2011 | Frazier |
| 2011/0284232 A1 | 11/2011 | Huang |
| 2011/0284240 A1 | 11/2011 | Chen et al. |
| 2011/0284243 A1 | 11/2011 | Frazier |
| 2012/0118583 A1 | 5/2012 | Johnson et al. |
| 2012/0130470 A1 | 5/2012 | Agnew et al. |
| 2012/0168152 A1 | 7/2012 | Casciaro |
| 2012/0211239 A1 | 8/2012 | Kritzler et al. |
| 2012/0292053 A1 | 11/2012 | Xu et al. |
| 2013/0048304 A1 | 2/2013 | Agrawal et al. |
| 2013/0105159 A1 | 5/2013 | Alvarez |
| 2013/0133897 A1 | 5/2013 | Baihly et al. |

FOREIGN PATENT DOCUMENTS

| | | | |
|---|---|---|---|
| CN | 101457321 | * | 6/2010 |
| CN | 101457321 B | * | 6/2010 |
| EP | 1857570 | * | 11/2007 |
| EP | 1857570 A2 | * | 11/2007 |
| GB | 912956 | | 12/1962 |
| JP | 61067770 | | 4/1986 |
| JP | 7-54008 | | 2/1995 |
| JP | 08232029 | | 9/1996 |
| JP | 8-232029 A1 | | 10/1996 |
| JP | 2010502840 A | | 1/2010 |
| KR | 95-0014350 | | 11/1995 |
| WO | 2008079485 | | 7/2008 |
| WO | 2009079745 A1 | | 7/2009 |
| WO | 2011071902 A3 | | 6/2011 |
| WO | 2011071910 A3 | | 6/2011 |

OTHER PUBLICATIONS

H. Watarai, Trend of research and development for magnesium alloys—reducing the weight of structural materials in motor vehicles, (2006) Science and technology trends, Quaterly review No. 18, 84-97.*

Patent Cooperation Treaty International Search Report and Written Opinion for International Patent Application No. PCT/US2012/034978 filed on Apr. 25, 2012, mailed on Nov. 12, 2012.

International Search Report and Written Opinion for International application No. PCT/US2012/034973 filed on Apr. 25, 2012, mailed on Nov. 29, 2012.

Notification of Transmittal of the International Search Report and the Written Opinion of the International Searching Authority; PCT/US2011/047000; Korean Intellectual Property Office; Mailed Dec. 26, 2011; 8 pages.

Canadian Pat. App. No. 2783241 filed on Dec. 7, 2010 titled Nanomatrix Powder Metal Compact.

Canadian Pat. App. No. 2783346 filed on Dec. 7, 2010, published on Jun. 16, 2011 for "Engineered Powder Compact Composite Material".

International Search Report and Written Opinion of the International Searching Authority, or the Declaration for PCT/US2011/058105 mailed from the Korean Intellectual Property Office on May 1, 2012.

Notification of Transmittal of the International Search Report and the Written Opinion of the International Searching Authority, or the Declaration mailed on Feb. 23, 2012 (Dated Feb. 22, 2012) for PCT/US2011/043036.

International Search Report and Written Opinion of the International Searching Authority for International Application No. PCT/US2011/058099 (filed on Oct. 27, 2011), mailed on May 11, 2012.

Flow Control Systems, [online]; [retrieved on May 20, 2010]; retrieved from the Internet http://www.bakerhughes.com/products-and-services/completions-and-productions/well-completions/packers-and-flow-control/flow-control-systems.

(56) References Cited

OTHER PUBLICATIONS

Optisleeve Sliding Sleeve, [online]; [retrieved on Jun. 25, 2010]; retrieved from the Internet weatherford.com/weatherford/groups/.../weatherfordcorp/WFT033159.pdf.

"Sliding Sleeve", Omega Completion Technology Ltd, Sep. 29, 2009, retrieved on: www.omega-completion.com.

Welch, William R. et al., "Nonelastomeric Sliding Sleeve Maintains Long Term Integrity in HP/HT Application: Case Histories." [Abstract Only], SPE Eastern Regional Meeting, Oct. 23-25, 1996, Columbus. Ohio.

Ambat, et al.; "Electroless Nickel-Plating on AZ91D Magnesium Alloy: Effect of Substrate Microstructure and Plating Parameters"; Surface and Coatings Technology; 179; pp. 124-134; (2004).

Chang, et al.; "Electrodeposition of Aluminum on Magnesium Alloy in Aluminum Chloride (A1C13)-1-ethyl-3-methylimidazolium chloride (EMIC) Ionic Liquid and Its Corrosion Behavior"; Electrochemistry Communications; 9; pp. 1602-1606; (2007).

Forsyth, et al.; "An Ionic Liquid Surface Treatment for Corrosion Protection of Magnesium Alloy AZ31"; Electrochem. Solid-State Lett./ 9(11); Abstract only; 1 page.

Forsyth, et al.; "Exploring Corrosion Protection of Mg Via Ionic Liquid Pretreatment"; Surface & Coatings Technology; 201; pp. 4496-4504; (2007).

Hsiao et al.; "Effect of Heat Treatment on Anodization and Electrochemical Behavior of AZ91D Magnesium Alloy"; J. Mater. Res.; 20(10); pp. 2763-2771;(2005).

Hsiao, et al.; "Anodization of AZ91D Magnesium Alloy in Silicate-Containing Electrolytes"; Surface & Coatings Technology; 199; pp. 127-134; (2005).

Hsiao, et al.; "Baking Treatment Effect on Materials Characteristics and Electrochemical Behavior of anodic Film Formed on AZ91D Magnesium Alloy"; Corrosion Science; 49; pp. 781-793; (2007).

Hsiao, et al.; "Characterization of Anodic Films Formed on AZ91D Magnesium Alloy"; Surface & Coatings Technology; 190; pp. 299-308; (2005).

Huo et al.; "Corrosion of AZ91D Magnesium Alloy with a Chemical Conversion Coating and Electroless Nickel Layer"; Corrosion Science: 46; pp. 1467-1477; (2004).

Liu, et al.; "Electroless Nickel Plating on AZ91 Mg Alloy Substrate"; Surface & Coatings Technology; 200; pp. 5087-5093; (2006).

Lunder et al.; "The Role of Mg17Al12 Phase in the Corrosion of Mg Alloy AZ91"; Corrosion; 45(9); pp. 741-748; (1989).

Pardo, et al.; "Corrosion Behaviour of Magnesium/Aluminium Alloys in 3.5 wt% NaCl"; Corrosion Science; 50; pp. 823-834; (2008).

Shi et al.; "Influence of the Beta Phase on the Corrosion Performance of Anodised Coatings on Magnesium-Aluminium Alloys"; Corrosion Science; 47; pp. 2760-2777; (2005).

Song, et al.; "Corrosion Mechanisms of Magnesium Alloys"; Advanced Engineering Materials; 1(1); pp. 11-33; (1999).

Song, Guangling; "Recent Progress in Corrosion and Protection of Magnesium Alloys"; Advanced Engineering Materials; 7(7); pp. 563-586; (2005).

Song, et al.; "Influence of Microstructure on the Corrosion of Diecast AZ91D"; Corrosion Science; 41; pp. 249-273; (1999).

Song, et al.; "Corrosion Behaviour of AZ21, AZ501 and AZ91 in Sodium Chloride"; Corrosion Science; 40(10); pp. 1769-1791; (1998).

Song, et al.; "Understanding Magnesium Corrosion"; Advanced Engineering Materials; 5; No. 12; pp. 837-858; (2003).

Zhang, et al; "Study on the Environmentally Friendly Anodizing of AZ91D Magnesium Alloy"; Surface and Coatings Technology: 161; pp. 36-43; (2002).

Chun-Lin, Li. "Design of Abrasive Water Jet Perforation and Hydraulic Fracturing Tool," Oil Field Equipment, Mar. 2011.

Notification of Transmittal of The International Search Report and the Written Opinion of the International Searching Authority; PCT/US2010/059257; Korean Intellectual Property Office; Mailed Jul. 27, 2011.

International Search Report and Written Opinion; Mail Date Jul. 28, 2011; International Application No. PCT/US2010/057763; International Filing date Nov. 23, 2010; Korean Intellectual Property Office; International Search Report 7 pages; Written Opinion 3 pages.

Constantine, Jesse. "Selective Production of Horizontal Openhole Completions Using ECP and Sliding Sleeve Technology." SPE Rocky Mountain Regional Meeting, May 15-18, 1999, Gillette, Wyoming. [Abstract Only].

International Search Report and Written Opinion; International Application No. PCT/US2012/038622; International Filing Date: May 18, 2012; Date of Mailing Dec. 6, 2012; 12 pages.

Shumbera et al. "Improved Water Injector Performance in a Gulf of Mexico Deepwater Development Using an Openhole Frac Pack Completion and Downhole Filter System: Case History." SPE Annual Technical Conference and Exhibition, Oct. 5-8, 2003, Denver, Colorado. [Abstract Only].

Vickery, Harold and Christian Bayne, "New One-Trip Multi-Zone Frac Pack System with Positive Positioning." European Petroleum Conference, Oct. 29-31, 2002, Aberdeen, UK. [Abstract Only].

Baker Oil Tools. "Z-Seal Metal-to-Metal Expandable Sealing Device Uses Expanding Metal in Place of Elastomers," Nov. 6, 2006.

\* cited by examiner

METHOD OF CONTROLLING THE CORROSION RATE OF ALLOY PARTICLES, ALLOY PARTICLE WITH CONTROLLED CORROSION RATE, AND ARTICLES COMPRISING THE PARTICLE

BACKGROUND

Certain downhole operations involve placement of elements in a downhole environment, where the element performs its function, and is then removed. For example, elements such as ball/ball seat assemblies and fracture (frac) plugs are downhole elements used to seal off lower zones in a borehole in order to carry out a hydraulic fracturing process (also referred to in the art as "fracking") to break up different zones of reservoir rock. After the fracking operation, the ball/ball seat or plugs are then removed to allow fluid flow to or from the fractured rock.

Balls and/or ball seats, and frac plugs, may be formed of a corrodible material so that they need not be physically removed intact from the downhole environment. In this way, when the operation involving the ball/ball seat or frac plug is completed, the ball, ball seat, and/or frac plug corrodes away. Otherwise, the downhole article may have to remain in the hole for a longer period than is necessary for the operation.

To facilitate removal, such elements may be formed of a material that reacts with the ambient downhole environment so that they need not be physically removed by, for example, a mechanical operation, but may instead corrode or dissolve under downhole conditions. However, while corrosion rates of, for example, an alloy used to prepare a corrodible article can be controlled by adjusting alloy composition, an alternative way of controlling the corrosion rate of a downhole article is desirable.

Corrodible materials may include those having a high activity on the saltwater galvanic series, such as a magnesium alloy adjusted for corrosion rate. It has been found that adjusting the amount of trace contaminants in a magnesium alloy can have a significant impact on the corrosion rate of such alloys (Song, G. and Atrens, A., "Understanding Magnesium Corrosion: A Framework for Improved Alloy Performance," *Adv. Eng. Mater.* 2003, 5(12) pp. 837-858). For example, metals such as nickel, iron, copper, calcium, etc., may be added to magnesium to increase the corrosion rate and other metals such as zirconium, yttrium, etc. may be added to decrease the corrosion rate. Balancing the amounts of such additives to achieve a desired bulk corrosion rate can in this way control overall corrosion of articles made from the alloy; however, such an approach requires preparation of multiple batches of alloy, requiring high batch-to-batch reproducibility and precise, reproducible control of metal additives or contaminants in the alloy.

There accordingly remains a need for controlling the overall corrosion rate of magnesium alloys for use in downhole articles without need for fine adjustment of alloy composition and with improved corrosion control.

SUMMARY

The above and other deficiencies of the prior art are overcome by, in an embodiment, a composite particle comprising a core, a shielding layer deposited on the core, and further comprising an interlayer region formed at an interface of the shielding layer and the core, the interlayer region having a reactivity less than that of the core, and shielding layer having a reactivity less than that of the interlayer region, a metallic layer not identical to the shielding layer and deposited on the shielding layer, the metallic layer having a reactivity less than that of the core, and optionally, an adhesion metal layer deposited on the metallic layer.

In another embodiment, a composite particle comprises a magnesium-aluminum alloy core, a shielding layer comprising an aluminum-containing layer deposited on the core, and further comprising an interlayer region comprising α-Mg and γ-$Mg_{17}Al_{12}$ formed at the interface between the magnesium alloy core and the aluminum-containing layer, and further comprising inclusions of alumina, magnesia, or a combination comprising at least one of these oxides, a metallic layer deposited on the shielding layer, the metallic layer comprising Ni, Fe, Cu, Co, W, alloys thereof, or a combination comprising at least one of the foregoing, an aluminum-containing shielding layer deposited on the metallic layer, and optionally, an aluminum-containing adhesion metal layer, wherein the interlayer region, shielding layer, metallic layer, and optional adhesion metal layer are inter-dispersed with each other.

In another embodiment, a method of adjusting corrosion rate in an aqueous electrolyte is disclosed for a composite particle having a core, a shielding layer deposited on the core, and further comprising an interlayer region formed at an interface of the shielding layer and the core, the interlayer region having a reactivity less than that of the core, and the shielding layer having a reactivity less than that of the interlayer region, a metallic layer not identical to the shielding layer and deposited on the shielding layer, the metallic layer having a reactivity less than that of the core, and optionally, an adhesion metal layer deposited on the metallic layer, the method comprising selecting the metallic layer such that the lower the reactivity of the metallic layer is relative to the shielding layer, the greater the corrosion rate, and selecting the amount, thickness, or both amounts and thicknesses of the shielding layer and metallic layer such that the less the amount, thickness, or both amount and thickness of the shielding layer relative to those of the metallic layer, the greater the corrosion rate.

BRIEF DESCRIPTION OF THE DRAWINGS

Referring now to the drawings wherein like elements are numbered alike in the several Figures:

FIG. 1 shows a cross-sectional view of a composite particle 100a having a multilayer structure (FIG. 1A) and a cross-sectional view of a composite particle 100b having an inter-dispersed layer (FIG. 1B);

FIG. 2 shows a cross-sectional view of a composite particle 200a having a multilayer structure (FIG. 2A) and a cross-sectional view of a composite particle 200b having an inter-dispersed layer (FIG. 2B)

DETAILED DESCRIPTION OF THE INVENTION

Disclosed herein is a composite particle useful for fabricating a corrodible article. The composite particle has multilayered structure of a core of a high reactivity material, such as magnesium or a magnesium alloy, coated a shielding layer such as for example, aluminum. At the interface of the shielding layer and the core, an intermetallic phase can form, such as a crystalline metallic compound of magnesium and aluminum, and present in discontinuous regions. The shielding layer, which includes the intermetallic regions, has a layer of a noble material with a lower reactivity (i.e., more noble than the shielding layer, though comparable in reactivity to the intermetallic phase) disposed on it. An additional layer of an adhesive metal, for example, aluminum, can be disposed over the noble material layer, to provide adhesion between particles upon molding. The interlayer region, shielding layer, noble material layer (referred to herein as the "metallic layer" where the noble material is a metal), and optional adhesion layer are believed to be inter-dispersed with each other, and form a compositionally varied outer shell which is also inter-dispersed with the core.

The noble material layer, which has a lower reactivity relative to the core material, acts as a cathode, whereas the core, made of a metal such as magnesium which is more reactive than the noble metal layer, is anodic relative to the noble metal layer. The shielding layer, which includes the intermetallic phase, is also cathodic relative to the core, but anodic relative to the noble metal layer. A galvanic discharge cycle (e.g., corrosion) occurs between the relatively anodic and relatively cathodic materials in the presence of an electrolyte. By adjusting the composition of the noble metal layer relative to the core and shielding layers, and by adjusting the amounts and/or thicknesses of the shielding and noble metal layers, the corrosion rate of the composite particle is adjusted.

The composite particles are formed into articles by compressing and shaping the particles using, for example, cold molding followed by forging.

The core includes any material suitable for use in a downhole environment, provided the core is corrodible in the downhole environment relative to a second material having a different reactivity. In an embodiment, the composite particle thus includes a magnesium-containing core. A magnesium-containing core includes any such alloy which is corrodible in a corrosive environment including those typically encountered downhole, such as an aqueous environment which includes salt (i.e., brine), or an acidic or corrosive agent such as hydrogen sulfide, hydrochloric acid, or other such corrosive agents. Magnesium alloys suitable for use include alloys of magnesium (Mg) with aluminum (Al), cadmium (Cd), calcium (Ca), cobalt (Co), copper (Cu), iron (Fe), manganese (Mn), nickel (Ni), silicon (Si), silver (Ag), strontium (Sr), thorium (Th), zinc (Zn), zirconium (Zr), or a combination comprising at least one of these elements. Particularly useful alloys include magnesium alloy particles including those prepared from magnesium alloyed with Ni, W, Co, Cu, Fe, or other metals. Alloying or trace elements can be included in varying amounts to adjust the corrosion rate of the magnesium. For example, four of these elements (cadmium, calcium, silver, and zinc) have mild-to-moderate accelerating effects on corrosion rates, whereas four others (copper, cobalt, iron, and nickel) have a still greater accelerating effect on corrosion. Exemplary commercially available magnesium alloys and which include different combinations of the above alloying elements to achieve different degrees of corrosion resistance include but are not limited to, for example, magnesium alloyed with aluminum, strontium, and manganese such as AJ62, AJ50x, AJ51x, and AJ52x alloys, and magnesium alloyed with aluminum, zinc, and manganese which include AZ91A-E alloys.

It will be appreciated that alloys having corrosion rates greater than those of the above exemplary alloys are contemplated as being useful herein. For example, nickel has been found to be useful in decreasing the corrosion resistance (i.e., increases the corrosion rate) of magnesium alloys when included in amounts of less than or equal to about 0.5 wt %, specifically less than or equal to about 0.4 wt %, and more specifically less than or equal to about 0.3 wt %, to provide a useful corrosion rate for the corrodible downhole article. In another embodiment, the magnesium-containing core comprises a magnesium-aluminum alloy.

Particle sizes for the magnesium alloy cores may be from about 50 to about 150 micrometers (μm), more specifically about 60 to about 140 μm, and still more specifically about 70 to about 130 μm. Useful magnesium alloys may include combinations of the above elements and/or contaminants sufficient to achieve a corrosion rate for the magnesium alloy core of about 0.1 to about 20 mg/cm$^2$/hour, specifically about 1 to about 15 mg/cm$^2$/hour using aqueous 3 wt % KCl solution at 200° F. (93° C.).

The composite particle includes a shielding layer. The shielding layer is formed by depositing on the core, a material having a lower reactivity than that of the core. In an exemplary embodiment, the shielding layer is an aluminum-containing layer deposited on the core. In an embodiment, the core is a magnesium alloy core and the shielding layer is an aluminum-containing layer. As used herein "on" and "deposited on" mean that a layer may or may not be in direct contact with, the underlying surface to which the layer is applied, unless otherwise specified as by stating that the layers are at least partially in contact. It will be further understood that "deposited" and "depositing," when used in with respect to a method, indicates the action of deposition, whereas "deposited" when used in the context of a composition or article, merely indicates the juxtaposition of the layer with respect to the substrate and does not indicate a process of deposition. The shielding layer further comprises an interlayer region formed at the interface of the core and shielding layer, which is compositionally derived from the core and shielding layers. In an embodiment, the interlayer region forms at the boundary of a magnesium-containing core and an aluminum-containing shielding layer, and the interlayer region comprises an intermetallic compound. For example, magnesium-aluminum alloys include an α-Mg phase, and in addition, a γ-$Mg_{17}Al_{12}$ intermetallic phase which accumulates at the grain boundaries within the Mg—Al alloy. The intermetallic γ-$Mg_{17}Al_{12}$ phase is generally present in amounts of less than 30 wt % of the Mg—Al alloy. Depending upon the composition, additional phases can also be present, including solid solution Al, and other intermetallic phases such as β-$Mg_2Al_3$. Upon deposition of the aluminum-containing shielding layer, the γ-$Mg_{17}Al_{12}$ phase forms and accumulates as well at the interface of the shielding layer and the Mg-containing core. Thermal treatment can accelerate the formation of the interlayer region. For example, heating at temperatures less than the eutectic point (e.g., less than or equal to about 450° C., depending on the alloy composition, and as long as the eutectic point is not exceeded) for about 15 minutes can form an intermetallic phase at the interface of the Mg-containing core and the Al-containing layer. The composite particle thus includes, as part of the interlayer region, the intermetallic compound γ-$Mg_{17}Al_{12}$. The interlayer region forms over the entire contacting area of the Mg-containing core and the Al-containing layer, or a portion of the contacting areas. Deposition method and any heat treating can be adjusted so that the intermetallic phase intervenes between a portion of contacting surfaces of the Mg alloy core and the Al-containing layer. The shielding layer further includes an oxide of one or more of the metals of which the core and/or shielding layers are comprised. For example, where the core comprises magnesium or a magnesium-aluminum alloy, and the shielding layer comprises aluminum, the shielding layer optionally includes oxides of magnesium (such as magnesia), aluminum (such as alumina), or a combination comprising at least one of the foregoing.

The composite particle further includes a metallic layer not identical to the shielding layer and deposited on the shielding layer. The metallic layer has a lower reactivity relative to the core, based on the saltwater galvanic series from lower reactivity (i.e., more noble metals) to high reactivity (i.e., less noble metals). In an embodiment, the metal(s) used for the metallic layer allow for the formation of hydrogen when used as a cathode in an electrochemical cell. The metallic layer thus comprises a group 6-11 transition metal. Specifically, the group 6-11 transition metal includes Ni, Fe, Cu, Co, W, alloys thereof, or a combination comprising at least one of the foregoing.

The composite particle optionally includes an adhesion layer deposited on the metallic layer. The adhesion layer comprises a material which promotes adhesion between the composite particles. An exemplary adhesion layer includes aluminum or an aluminum alloy. Upon compressing and forging of the adhesion layer-coated composite particles to form a molded article, the particles bind to one another through interparticle contact via the material of the adhesion layer, to further provide mechanical strength to the article.

The layers (shielding layer, metallic layer, and optional adhesion layer) may each have an average thickness of about 0.05 to about 0.15 μm, and specifically about 0.07 to about 0.13 μm. In an embodiment, each layer does not completely cover the underlying layer, and the layer coverage is thus discontinuous. Furthermore, where the layers are "on" one another, interstitial spaces at the interfaces of the layers may be present. In an embodiment, the interlayer region, shielding layer, metallic layer, and optional adhesion metal layer are inter-dispersed with each other. As used herein, "inter-dispersed" mean that two or more adjacent layers interpenetrate into or through each other in intimate admixture, where it will be appreciated that two (or more) inter-dispersed layers have, on average, a compositional gradient due to the interpenetration of one layer into the adjacent layer.

The core and shielding layer, shielding layer and metallic layer, and metallic layer and optional adhesion layer, are each thus in mutual partial contact, and are inter-dispersed, such that components of the core, the shielding layer, and the metallic layer are present at the exposed surface of the composite particle.

In an embodiment, the composite particles have a corrosion rate of about 0.1 to about 20 mg/cm$^2$/hour, specifically about 1 to about 15 mg/cm$^2$/hour using an aqueous 3 wt % KCl solution at 200° F. (93° C.).

In a specific embodiment, the shielding layer is an aluminum-containing layer, and the core is a magnesium-containing core. In an embodiment, the shielding layer comprises aluminum. In another embodiment, the shielding layer further comprises, in addition to aluminum, inclusions of alumina, magnesia, or a combination comprising at least one of these oxides. The shielding layer further includes an interlayer region formed at the interface between the magnesium alloy core and the first aluminum-containing layer. In an embodiment, the interlayer region comprises $\gamma$-Mg$_{17}$Al$_{12}$.

Also in a specific embodiment, the metallic layer comprises a group 6-11 transition metal on the shielding layer. The group 6-11 transition metal includes Ni, Fe, Cu, Co, W, alloys thereof, or a combination comprising at least one of the foregoing.

Optionally, in a specific embodiment, the adhesion layer is an aluminum-containing layer deposited on the metallic layer.

Deposition of the shielding, metallic, and adhesion layers on the core is not particularly limited. Where either or both of the shielding and optional adhesion layers includes aluminum or an aluminum alloy, uniformly depositing the aluminum layer(s) on a magnesium alloy core particle is accomplished in one exemplary embodiment by decomposition of an organometallic compound, such as triethylaluminum (having a boiling point of 128-130° C. at 50 mm Hg), after introducing the organometallic compound into a fluidized bed reactor containing the magnesium alloy core particles to deposit the shielding layer, or the introducing the organometallic compound into a reactor containing magnesium alloy core/shielding layer/metallic layer particles to deposit the adhesion layer. The interlayer region, which in this case includes an intermetallic compound such as $\gamma$-Mg$_{17}$Al$_{12}$, further forms at the interface of the Mg alloy core and the shielding layer by a thermal treatment, such as sintering and/or annealing, and/or forging of an article molded from the composite particles, at a temperature below the melting point of all or part of the composite particle.

Similarly, depositing a uniform metallic layer is also not particularly limited, and may be accomplished by, for example, decomposition of an organometallic compound (such as nickel carbonyl where the metallic layer is nickel) after introducing the organometallic compound into a fluidized bed reactor containing the magnesium alloy core particles coated with the shielding layer.

The core can also be coated with materials for the shielding layer, metallic layer, and optional adhesion layer using a physical mixing method. For example, the core can be admixed with one or more components of the shielding layer, metallic layer, and optional adhesion layer by cryomilling, ball milling, or the like. In this way, the shielding, metallic layer and adhesion layer components can be included sequentially, or components for two or all three layers included simultaneously. Combinations of deposition methods including vapor phase deposition and physical methods can also be used to provide the composite particles. Where all components are included by physical mixing simultaneously, it will be appreciated that a single layer is formed which is a composite of the shielding layer, metallic layer, and adhesion layer components.

In another embodiment, the core comprises an inner core of a first core material and an outer core of a second core material, the inner core material having a lower reactivity than that of the outer core. The inner core is any material useful for depositing thereon a high reactivity material such as magnesium, without limitation. The inner core can thus be any suitable, low reactivity material, such as a 6-11 transition metal including Ni, Fe, Cu, Co, W, alloys thereof, or a combination comprising at least one of the foregoing; a metal oxide such as alumina, silica, silicates, iron oxides, titania, tungstates, and the like; a polymer including a phenolic polymer; ceramics; glasses; or other such materials. In an exemplary embodiment, the inner core comprises an aluminum alloy, nickel, iron, alumina, titania or silica, and the outer core comprises magnesium or a magnesium alloy as described hereinabove. The outer core is deposited on the inner core using any suitable deposition method such as physical vapor deposition (PVD) of the metallic magnesium or magnesium alloy in a fluidized bed reactor. The core structure having inner and outer cores is then coated with shielding layer, metallic layer, and optional adhesion layer as described above to form the composite particle.

The composite particle generally has a particle size of from about 50 to about 150 micrometers (μm), and more specifically about 60 to about 140 μm.

In another embodiment, a method of adjusting corrosion rate of a composite particle, or article prepared therefrom, is disclosed. In an embodiment, adjusting is accomplished by either or both of selecting the composition of the metallic layer to have the desired reactivity, where the lower the reactivity of the metallic layer relative to the shielding layer (and by definition, to both the core and interlayer region), the faster the corrosion rate; and conversely, the higher the reactivity of the metallic layer relative to the shielding layer, the slower the corrosion rate. Alternatively or in addition, in an embodiment, adjusting is accomplished by increasing the amount and/or thickness of the shielding layer for any given amount and/or thickness of metallic layer. It will further be appreciated that additional control of the corrosion rate is accomplished by the degree of inter-dispersion of the core, interlayer region, shielding layer, and metallic layer, where the more highly inter-dispersed these layers are, the greater the corrosion rate, and conversely, the less inter-dispersed the layers, the slower the corrosion rate. Thus, amount and thickness as used herein are related in that the higher the amount of a layer, expressed as weight percent based on the weight of the composite particle, the greater the thickness.

The surface of the composite particles includes both anodic and cathodic regions of the inter-dispersed layers. It will be understood that "anodic regions" and "cathodic regions" are relative terms, based on the relative reactivity of the inter-dispersed materials. For example as discussed above, magnesium (from the core) is anodic relative to the cathodic intermetallic compound of the interlayer region ($\gamma$-$Mg_{17}Al_{12}$) and cathodic aluminum from the interlayer region/shielding layer, and anodic relative to nickel from the cathodic metallic layer. Similarly, intermetallic compound ($\gamma$-$Mg_{17}Al_{12}$) is anodic relative to cathodic aluminum from the shielding layer, and anodic relative to nickel from the cathodic metallic layer; and aluminum from the shielding layer is anodic relative to nickel from the metallic layer.

In this way, upon exposure of the surface of the composite particle (and any article made from the composite particles) to an electrolyte, multiple localized corrosion mechanisms take place in which reversal of anodic and cathodic regions occur. For example, after exposed anodic core material (such as magnesium) is corroded, a previously cathodic material (such as intermetallic compound or aluminum in the shielding layer) becomes anodic and is corroded by interaction with the more cathodic metallic layer (e.g., which includes nickel, etc.). As the surface corrodes away and new, more anodic core material such as magnesium is exposed, the situation again reverses and the aluminum or intermetallic compound becomes cathodic toward the core material.

As corrosion advances in localized regions on the surface between anodic and cathodic regions in the presence of an electrolyte fluid (water, brine, etc.), these regions, referred to herein as micro-cells, can corrode outward over the surface of the composite particle and link to other micro-cells to form larger corrosion regions, which in turn can link to other corrosion regions, etc., as further anodic materials such as magnesium (from the core) or intermetallic $\gamma$-$Mg_{17}Al_{12}$ (from the interlayer region/shielding layer) is exposed. After these regions corrode, new, underlying anodic materials from the core are exposed to the electrolyte. Upon corroding, these inter-dispersed layers can thus become permeable to the electrolyte fluid. This allows percolation of electrolytic fluids into the corroding surface to penetrate and undermine the layers, and the process repeats until the corrodible materials are consumed. It will be appreciated that the presence of metal oxides at the core/shielding layer interface also decreases the corrosion rate of the core at the interface by acting as an inert barrier, and thus affects the relative anodic/cathodic character of the micro-cell (for example, where alumina and/or magnesia are present between a magnesium core and the intermetallic compound, the intermetallic compound is insulated from the core and will be anodic relative to the metallic layer). In this way, the presence of inclusions of metal oxides affects the overall corrosion rate of the composite particle.

Where the core comprises an inner and outer core in which the outer core is anodic, corrosion advances until only the inner core remains. The inner core thus exposed no longer has the structural integrity and cohesiveness of the composite particle, and disperses into the surrounding fluid as a suspension of particles, and can be removed in this way.

Thus, in an embodiment, a method of adjusting corrosion rate in a composite particle includes selecting the metallic layer such that the lower the reactivity of the metallic layer is relative to the shielding layer, the greater the corrosion rate. In another embodiment, a method of adjusting corrosion rate in a composite particle includes selecting the amount, thickness, or both amounts and thicknesses of the shielding layer and the metallic layer such that the less the amount, thickness, or both amount and thickness of the shielding layer are relative to those of the metallic layer, the greater the corrosion rate. The interlayer region, shielding layer, metallic layer, and optional adhesion metal layer being inter-dispersed with each other, and have compositions as discussed above.

In another embodiment, an article comprises the composite particles which may be provided as a powder or other suitable form such as a pre-compressed pellet. Articles may be prepared from the composite particle by compressing or otherwise shaping the composite particles, to form an article having the appropriate shape. For example, the composite particles are molded or compressed into the desired shape by cold compression using an isostatic press at about 40 to about 80 ksi (about 275 to about 550 MPa), followed by forging or sintering and machining, to provide an article having the desired shape and dimensions. As disclosed herein, forging or sintering is carried out at a temperature below that of the melting point of the components.

Thus, a method of forming an article comprises molding the composite particles and forging the molded article.

The article so prepared is referred to as a controlled electrolytic material (CEM) article, and useful under downhole conditions. Articles include, for example a ball, a ball seat, a fracture plug, or other such downhole article. However, it should be understood that though these articles are disclosed, there are other uses for the composite particles in powder form. For example, the composite particles may be included in a matrix that is non-metallic, and may be applied to a surface as a coating, such as a paint, powder coating, etc., where a controlled electrolytic process occurs in the presence of water, and preferably, water plus an electrolyte. Such processes may include coatings for marine applications such as drill rigs, boat or ship hulls, undersea tools, or other such applications. Such an electrolytic material may provide a sacrificial layer to mitigate or prevent corrosion of an underlying metal layer, or may alternatively prevent adhesion of, for example, marine organisms to the underwater surface coated with the composite particles.

Figure 1A:
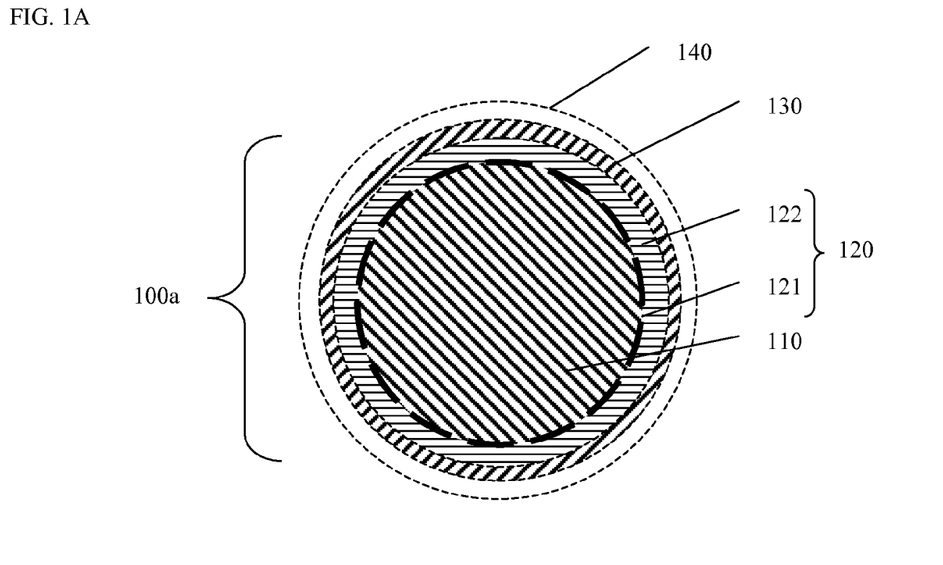

An exemplary use is described herein. FIG. 1 shows in schematic cross-section different structural variants of the composite particles 100a and 100b. In FIG. 1A, the composite particle 100a includes a core 110; a shielding layer 120 which includes an intermetallic region 121 (heavy dashed line) and aluminum layer 122 surrounding the intermetallic region; a metallic layer 130, and optionally, a second aluminum layer 140 which functions as an adhesion layer. This adhesion layer 140 may be included to promote the adhesion of particles when compressed together to form a shaped article. It will be appreciated that the layers, while shown as discrete core-shell layers, can also be intermixed at the interfaces and/or the layers can be discontinuous on the surfaces to which they are applied, such that core 110 is actually in contact with shielding layer 120 and/or metallic layer 130 and/or adhesion layer 140.

Figure 1B:
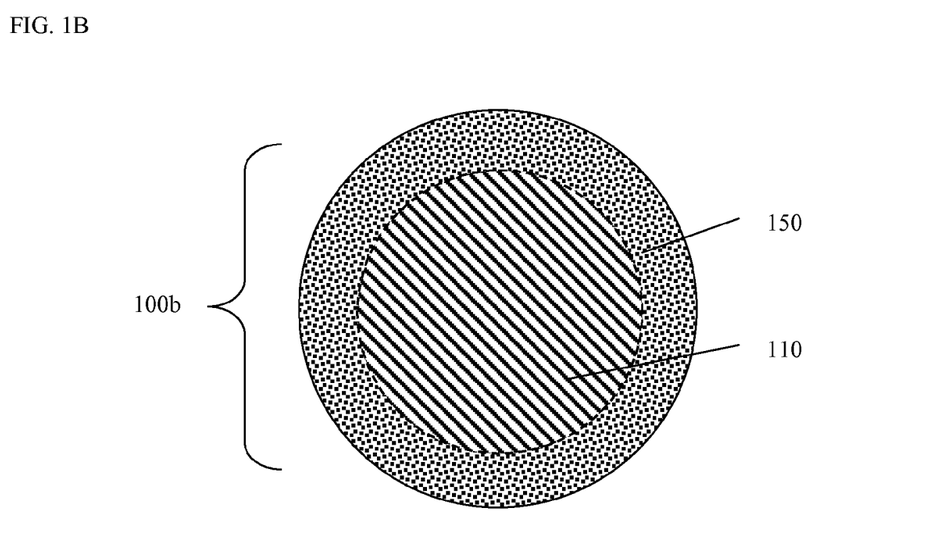

In FIG. 1B, composite particle 100b has a core 110 and an inter-dispersed layer 150 which includes the components of the interlayer region, shielding layer, metallic layer, and optional adhesion layer (not shown individually in FIG. 1B). It will be appreciated that such an inter-dispersed structure can derive from a discontinuous core-shell structure as described in FIG. 1A, and in which inter-dispersion is enhanced by thermal treatment (e.g., sintering); or the inter-dispersed structure can derive from a physical method of forming the particles (e.g., cryo- or ball-milling) or by including precursor materials for more than one layer into a fluidized bed reactor during layer formation. The inter-dispersed layer 150 is homogeneously inter-dispersed with the components of the different layers (interlayer region, shielding layer, metallic layer) equally distributed throughout inter-dispersed layer 150, or is non-uniformly distributed, for example, in a gradient where the composition changes from predominantly interlayer region composition at the interface of inter-dispersed layer 150 and core 110, to predominantly adhesion layer composition at the outer surface of inter-dispersed layer 150.

Figure 2A:
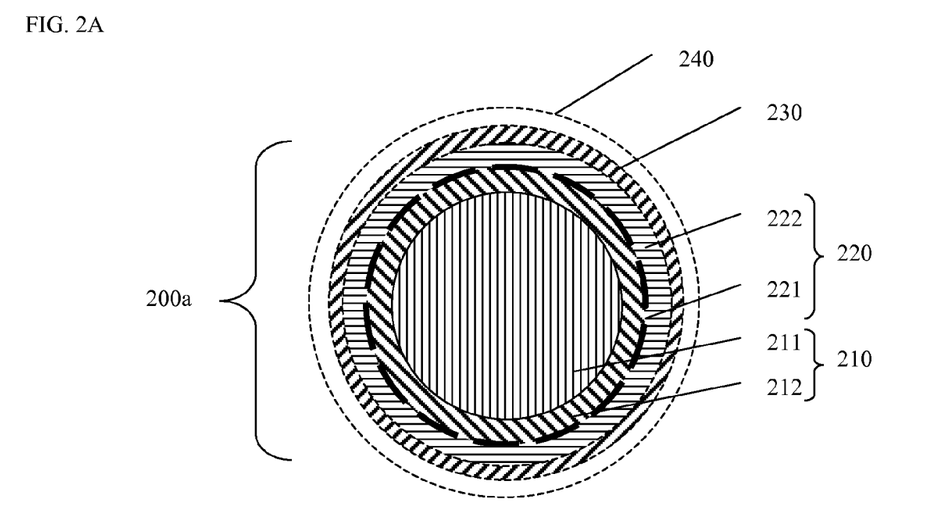

FIG. 2 shows, similar to FIG. 1, cross-sectional views of different structural variants of the composite particles 200a and 200b. In FIG. 2A, the composite particle 200a includes a core 210 comprising inner core 211 and outer core 212; a shielding layer 220 which includes an intermetallic region 221 (heavy dashed line) and aluminum layer 222 surrounding the intermetallic region; a metallic layer 230, and optionally, a second aluminum layer 240 which functions as an adhesion layer. As in FIG. 1A, it will be appreciated that the layers, while shown as discrete core-shell layers, can also be intermixed at the interfaces and/or the layers can be discontinuous on the surfaces to which they are applied.

Figure 2B:
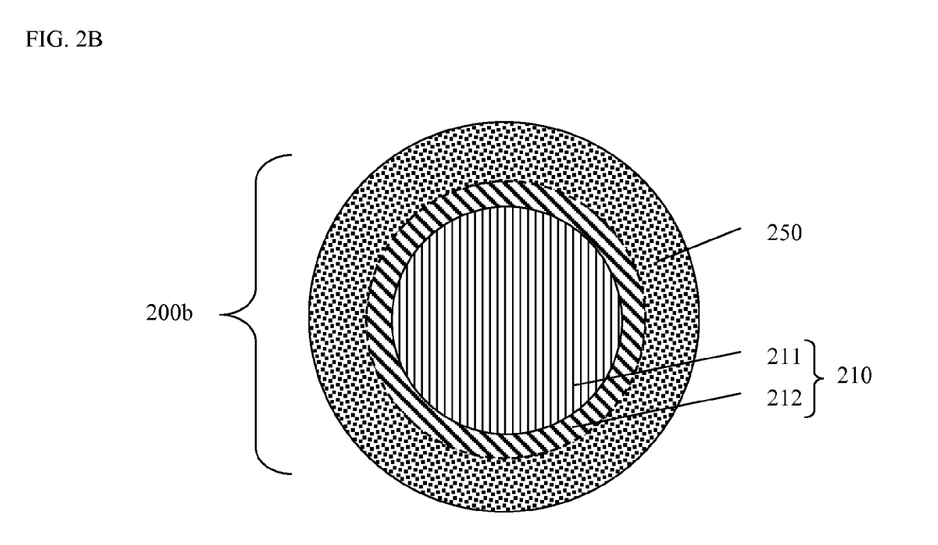

In FIG. 2B, composite particle 200b has a core 210 comprising inner core 211 and outer core 212 and an inter-dispersed layer 250 which includes the components of the interlayer region, shielding layer, metallic layer, and optional adhesion layer (not shown individually in FIG. 2B). As in FIG. 1B, it will be appreciated that such an inter-dispersed structure can derive from a discontinuous core-shell structure, from milling to form the particles, or by including precursor materials for more than one layer into a fluidized bed reactor during layer formation. Also as in FIG. 1B, the composition of inter-dispersed layer 250 is homogeneously distributed, or is non-uniformly distributed, such as for example, in a gradient.

Figure 3:
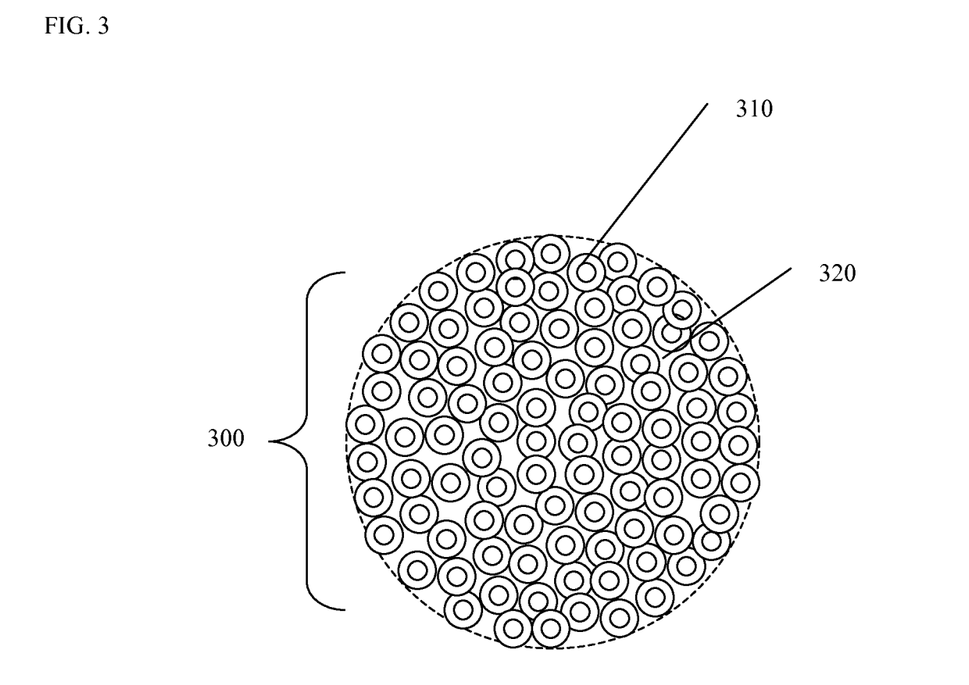
FIG. 3 shows a cross-sectional view of an exemplary corrodible downhole article 300 prepared from the composite particles 310.

In FIG. 3, as an exemplary article, a ball 300 is shown. In FIG. 3, the ball 300 is composed of composite particles 310. During cold compacting to form ball 300, the powdered composite particles 310 are compressed into and shaped to form the spherical ball 300 with interstitial spaces 320, where the interstitial spaces 320 are further reduced in volume by forging and/or sintering to reduce free volume from about 20% after compacting to less than about 5%, specifically less than about 3%, and still more specifically less than about 1% after forging/sintering. When used in conjunction with a ball seat (not shown) and seated in the ball seat to prevent fluid flow past the ball/ball seat, ball 300 forms a downhole seal for isolating, for example, a fracture zone located below the ball/ball seat assembly.

While one or more embodiments have been shown and described, modifications and substitutions may be made thereto without departing from the spirit and scope of the invention. Accordingly, it is to be understood that the present invention has been described by way of illustration and not limitation.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorant). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A composite particle, comprising:
   a core,
   a shielding layer deposited on the core, and further comprising an interlayer region formed at an interface of the shielding layer and the core, the interlayer region having a reactivity less than that of the core, and the shielding layer having a reactivity less than that of the interlayer region,
   a metallic layer not identical to the shielding layer and deposited on the shielding layer, the metallic layer having a reactivity less than that of the core, and
   optionally, an adhesion metal layer deposited on the metallic layer,
   wherein at least one of the shielding layer, the interlayer region, the metallic layer, and the optional adhesion metal layer is discontinuous, and
   wherein the composite particle is corrodible in the presence of an electrolyte fluid.

2. The composite particle of claim 1, wherein the core comprises magnesium, the shielding layer comprises aluminum and, optionally, oxides of aluminum, magnesium, or a combination comprising at least one of the foregoing, and the interlayer region comprises an intermetallic compound.

3. The composite particle of claim 2, wherein the intermetallic compound is $\gamma\text{-Mg}_{17}\text{Al}_{12}$.

4. The composite particle of claim 1, wherein the metallic layer comprises a group 6-11 transition metal.

5. The composite particle of claim 4, wherein the group 6-11 transition metal comprises Ni, Fe, Cu, Co, W, alloys thereof, or a combination comprising at least one of the foregoing.

6. The composite particle of claim 1, wherein the core comprises an inner core of a first core material and an outer core of a second core material, the inner core material having a lower activity than that of the outer core.

7. The composite particle of claim 6, wherein the inner core comprises aluminum, and the outer core comprises magnesium.

8. The composite particle of claim 1, wherein the core comprises a magnesium-aluminum alloy.

9. The composite particle of claim 1, wherein the core and shielding layer, shielding layer and metallic layer, and metallic layer and optional adhesion metal layer, are each in mutual partial contact.

10. The composite particle of claim 1, wherein the interlayer region, shielding layer, metallic layer, and optional adhesion metal layer are inter-dispersed with each other.

11. The composite particle of claim 1, wherein the shielding layer is cathodic relative to the core, and anodic relative to the metallic layer.

12. A composite particle, comprising:
a magnesium-aluminum alloy core,
a shielding layer comprising an aluminum-containing layer deposited on the core, further comprising an interlayer region comprising $\gamma\text{-}Mg_{17}Al_{12}$ formed at the interface between the magnesium alloy core and the aluminum-containing layer, and further comprising inclusions of alumina, magnesia, or a combination comprising at least one of these oxides,
a metallic layer deposited on the shielding layer, the metallic layer comprising Ni, Fe, Cu, Co, W, alloys thereof, or a combination comprising at least one of the foregoing,
and
optionally, an aluminum-containing adhesion metal layer deposited on the metallic layer,
wherein the interlayer region, shielding layer, metallic layer, and optional adhesion metal layer are inter-dispersed with each other.

13. A method of forming an article, comprising molding the composite particles of claim 1, and forging the molded article.

14. An article comprising the composite particles of claim 1.

15. The article of claim 14, wherein the article comprises a ball, ball seat, or fracture plug.

16. A coating comprising the composite particles of claim 1.

17. The composite particle of claim 1, wherein the core is in partial mutual contact with the shielding layer, the metallic layer, the optional adhesion metal layer, or a combination comprising at least one of the foregoing.

18. The composite particle of claim 1, wherein each of the core, the shielding layer, the interlayer region, the metallic layer, and the optional adhesion metal layer is discontinuous.

19. The composite particle of claim 1, wherein the electrolyte comprises water or brine.

* * * * *